US011708223B2

(12) United States Patent
Gharz

(10) Patent No.: US 11,708,223 B2
(45) Date of Patent: Jul. 25, 2023

(54) DEVICE FOR ALIGNMENT OF PACKAGES

(71) Applicant: Deutsche Post AG, Bonn (DE)

(72) Inventor: Usama Gharz, Wandlitz (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/480,484

(22) Filed: Sep. 21, 2021

(65) Prior Publication Data

US 2022/0097981 A1 Mar. 31, 2022

(30) Foreign Application Priority Data

Sep. 25, 2020 (DE) ...................... 10 2020 125 077.0

(51) Int. Cl.
*B65G 47/26* (2006.01)
*B65G 47/22* (2006.01)
*B65G 47/96* (2006.01)

(52) U.S. Cl.
CPC ...... *B65G 47/26* (2013.01); *B65G 2201/0235* (2013.01)

(58) Field of Classification Search
None
See application file for complete search history.

(56) References Cited

U.S. PATENT DOCUMENTS

| | | | |
|---|---|---|---|
| 2,815,112 A | 12/1957 | Engleson et al. | |
| 2,905,295 A | 9/1959 | Anderson | |
| 4,004,677 A * | 1/1977 | Heier | B65G 47/681 198/452 |
| 4,549,645 A | 10/1985 | Applegate | |
| 4,732,268 A | 3/1988 | Sjostrand | |
| 4,830,173 A * | 5/1989 | Hartness | B65G 47/71 198/463.4 |
| 5,730,270 A | 3/1998 | Malow | |
| 6,032,782 A * | 3/2000 | Sampson | B65G 47/244 198/374 |
| 6,863,173 B2 * | 3/2005 | Bennett | B65G 47/22 198/456 |
| 2015/0314965 A1* | 11/2015 | Churchill | B65G 37/00 198/382 |
| 2017/0333952 A1 | 11/2017 | Hartmann et al. | |

FOREIGN PATENT DOCUMENTS

| | | |
|---|---|---|
| CH | 625183 A5 | 9/1981 |
| CN | 103101751 A | 5/2013 |
| CN | 203975859 A | 12/2014 |
| CN | 106743408 A | 5/2017 |
| CN | 211224040 U | 8/2020 |
| DE | 1123975 | 2/1962 |
| DE | 3340763 A1 | 5/1984 |
| DE | 102016109315 A1 | 11/2017 |
| JP | 64-28120 A | 1/1989 |
| WO | 9530614 A1 | 11/1995 |

* cited by examiner

*Primary Examiner* — Kavel Singh
(74) *Attorney, Agent, or Firm* — The Webb Law Firm

(57) ABSTRACT

A device for aligning packages, in particular in a sorter, with a first connecting element for connection to a package conveyor, and a routing element connected to the first connecting element, wherein the routing element forms a contact face which comes into contact with the packages for alignment, in particular for realignment, of the packages. Here, the contact face is formed at least partially curved.

18 Claims, 4 Drawing Sheets

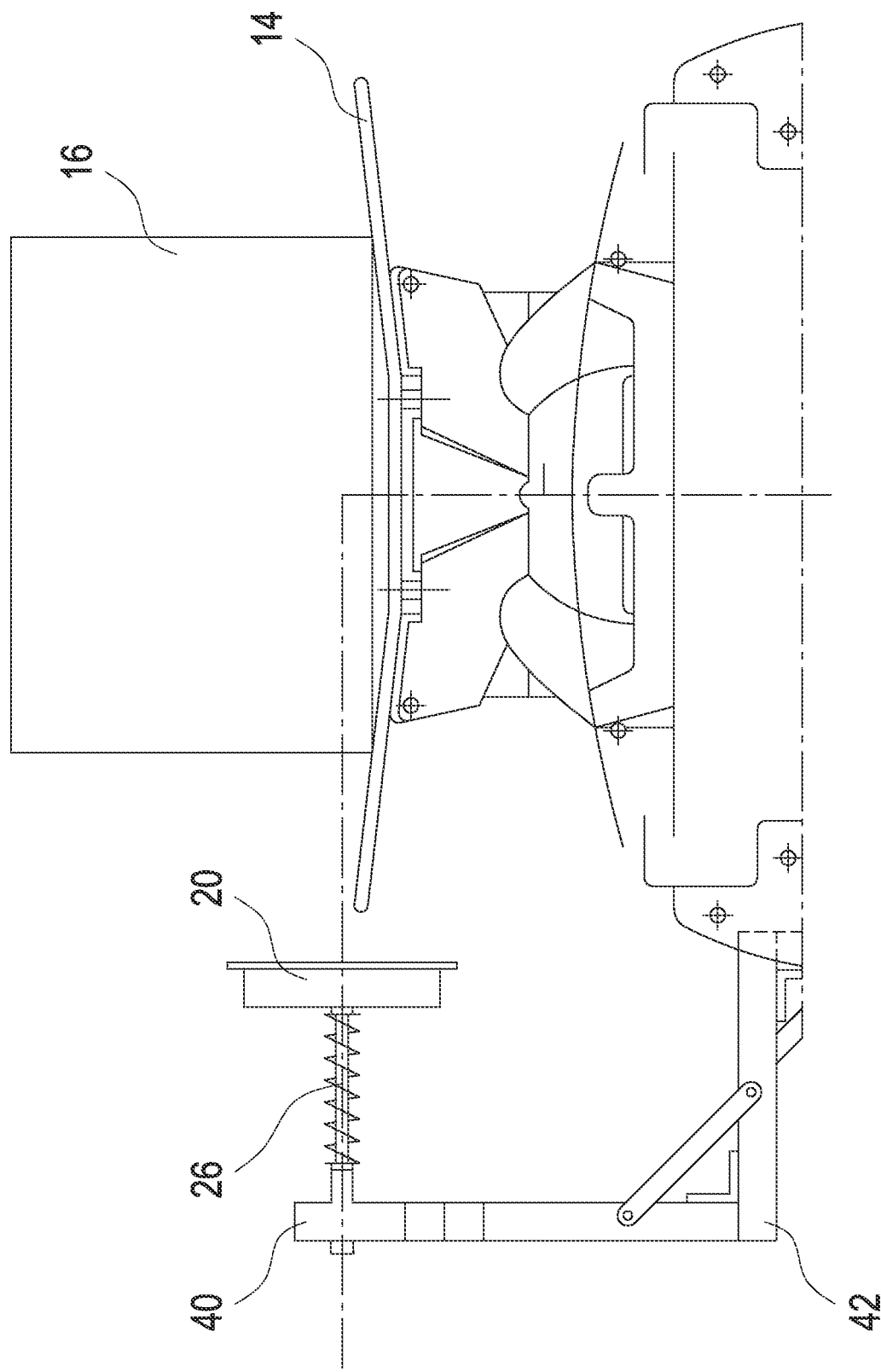

DEVICE FOR ALIGNMENT OF PACKAGES

CROSS-REFERENCE TO RELATED APPLICATION

This application claims priority to German Patent Application No. 10 2020 125 077.0 filed Sep. 25, 2020, the disclosure of which is hereby incorporated by reference in its entirety.

BACKGROUND

Field of the Invention

The present disclosure concerns a device for alignment, in particular for realignment, of packages, in particular in a sorter. Furthermore, the present disclosure concerns a package conveyor with such a device and a sorter with such a package conveyor.

Technical Background

In the transport of packages, in particular inside a sorter for conveying, sorting and distribution by means of a package conveyor, faults often occur when individual packages are pushed outside the nominal track, in particular when travelling around corners, and protrude laterally beyond the package conveyor. Also, individual packages become twisted when the trays tilt and straighten.

Protruding packages however have a tendency to skew or jam, and thus prevent movement of the following packages. In particular, because of the high speed of known package conveyors, a great number of packages can then fall off the package conveyor and must be manually re-introduced at the outlet. There is also a danger of damaging the packages or even damaging the sorter or package conveyor. At the same time, there is a considerable risk of injury when eliminating such faults, firstly from the falling packages themselves or secondly because working regions may be difficult to access.

SUMMARY

The object of the present disclosure is to present a device which avoids disruption of a package conveyor or sorter caused by protruding packages. This object may be achieved by a device for aligning packages according to claim 1, by a package conveyor according to claim 14, and by a sorter according to claim 15.

According to a non-limiting embodiment or aspect, provided is a device for aligning packages, in particular in a sorter, including a first connecting element for connection to a package conveyor. A routing element is connected to the first connecting element. Here, the connecting element is arranged in particular at a first end of the routing element. The routing element forms a contact face which comes into contact with the packages for alignment, in particular for realignment, of the packages. In particular, in normal operation there is no contact between the device and the packages. If the package is incorrectly aligned and/or is protruding, the package comes into contact with the contact face of the routing element and is realigned thereby, i.e. returned to its nominal track. Here, the contact face is formed at least partially curved. The curvature may provide a force transmission from the routing element onto the package, so that the package is moved back onto the nominal track of the package conveyor. It has been found that the curved contact face moves the packages back onto the nominal track of the package conveyor earlier, so that a shorter length of the routing element is sufficient in comparison with a non-curved contact face. At the same time, the curvature may also prevents an undesirable twisting of the package.

In some non-limiting embodiments or aspects, the routing element may be fixedly connected to the first connecting element. This ensures that, even for heavy packages, sufficient force can be transmitted to the package to move said package back onto the nominal track of the package conveyor.

In some non-limiting embodiments or aspects, the routing element may be at least partially flexible. Thus, the routing element deflects according to the weight of the package. Because of the deflection of the routing element, optimal force transmission to the package can take place so that the package can be moved back onto the nominal track of the package conveyor. Lightweight packages may cause a slight deflection of the routing element, while heavy packages may cause a greater deflection of the routing element. Because of the flexible design of the routing element, a return force may be generated. The return force is dependent on the weight of the respective package, so that a greater return force is created for heavy packages than for lighter packages in order to move the packages back onto the nominal track of the package conveyor. Because of the flexible design of the routing element itself, hinges may not be necessary to allow for the movability of the routing element. This simplifies the structure and does not require the need for wearing parts such as for example hinges.

In some non-limiting embodiments or aspects, a second connecting element is provided for connection to a package conveyor. Here, the second connecting element may be arranged at a second end of the routing element opposite the first end. The routing element is movably connected to the second connecting element, so that with a flexible design of the routing element, the movability of at least part of the routing element may be achieved. In some non-limiting embodiments or aspects, in a mounted state, the second connecting element may be arranged downstream of the first connecting element in the movement direction.

In some non-limiting embodiments or aspects, the second connecting element includes a spring element to form a movable connection to the routing element. In some non-limiting embodiments, the second connecting element may include one spring element. Providing one spring element allows for the movability of the routing element so that it can adapt to individual packages. The movability by the second connecting element may take place along an axis lying perpendicularly to the contact face. This allows for movement of the routing element in the direction transversely to the contact face, in order to adapt appropriately to the shape of the packaging.

In some non-limiting embodiments or aspects, the spring element includes a first guide element which is connected to the routing element. Furthermore, the spring element may include a stationary second guide element which is movably connected to or intermeshes with the first guide element. In some non-limiting embodiments, the first guide element is movable relative to the second guide element against the spring force of the spring element. In other non-limiting embodiments, the first guide element and the second guide element have a play so as to allow a transverse movability, i.e. perpendicularly to the flexing direction of the routing element. In some non-limiting embodiments, the first guide element and the second guide element are a guide bush and a guide rail guided therein. In other non-limiting embodiments, the guide bush has an opening diameter which is greater than the outer diameter of the guide rail, thereby allowing movability. In some non-limiting embodiments, two guide bushes are provided which are arranged one behind the other along the guide rail, wherein an opening of the first guide bush is formed larger than an opening of the second guide bush. This may achieve transverse movability of the routing element. In some non-limiting embodiments, the first guide bush is arranged in front of the second guide bush, starting from the guide element, and the opening of the second guide bush has a diameter which corresponds to the outer diameter of the guide rail.

In some non-limiting embodiments or aspects, a third connecting element is provided for connection to a package conveyor, wherein the routing element is fixedly connected to the third connecting element. The third connecting element may be arranged between the first connecting element and the second connecting element.

According to some non-limiting embodiments or aspects, a first portion of the routing element is defined between the first connecting element and the third connecting element. Furthermore, a second portion of the routing element is defined between the third connecting element and the second connecting element. The first portion and the second portion may have a length ratio of the first portion to the second portion of 1:1 to 1:10, and in particular 1:2 to 1:3.

According to some non-limiting embodiments or aspects, the first portion is configured so as to be straight and thus has no curvature. Alternatively or additionally, the first portion may be configured so as to be inflexible. Thus, the first portion of the contact face forms a portion which generates a large return force on heavy and large packages in order to move these back onto the nominal track of the package conveyor.

In some non-limiting embodiments or aspects, the first portion is arranged at an angle to the movement direction of the package conveyor. The first portion in mounted state may be angled along the movement direction in the direction of the package conveyor.

In some non-limiting embodiments or aspects, the second portion is configured so as to be curved or at least partially curved. Alternatively or additionally, the second portion may be configured so as to be flexible and thus deflects according to the weight of the package. This may produce an optimum return of the respective package, by providing a return force adapted to the weight of the respective package.

According to some non-limiting embodiments or aspects, a hinge face is provided in the region of the second portion, wherein the routing element rests on the hinge face during deflection. Here the flexing movement of the routing element takes place around the hinge face as a hinge point. By adapting the position of the hinge face, the flexing behaviour of the routing element may be adapted to the respective application of the device, and an optimum flexing behaviour of the routing element can be achieved.

According to some non-limiting embodiments or aspects, the contact face has a first curvature and a second curvature opposite the first curvature. Insofar as a first portion and a second portion are defined by the routing element, the curvature of the second portion may have a first curvature and a second curvature opposite the first curvature. In other non-limiting embodiments, in a mounted state, the first curvature and the second curvature are arranged one behind the other in the movement direction. In other non-limiting embodiments, the first curvature is provided starting at the first connecting element or third connecting element, while the second curvature ends at the second connecting element. The first curvature, in a mounted state, may point in the direction of the package conveyor, and the second curvature may point away from the direction of the package conveyor. This creates a substantially S-shaped contact face. The first curvature and the second curvature may be formed identically or differently with respect to the curve parameters, such as for example the curve radius and length. The first curve initially generates a sufficient force for accelerating the respective package in the direction of the nominal track of the package conveyor. This force is reduced by the second curve, whereby an undesirable twist of the package at the end of the contact face may be avoided.

In some non-limiting embodiments or aspects, at the second end, the contact face is substantially parallel to the conveying direction of the package conveyor. This ensures that, substantially, no more force is transmitted to the package at the second end of the routing element. This effectively prevents an undesirable twisting of the package in the package conveyor.

In some non-limiting embodiments or aspects, the contact face is formed from polyethylene (PE). The contact face may be formed by PE with a particularly high molar weight (PE-UHMW—"Ultra High Molar Weight"). The contact face may further be formed from a PE-UHMW such as TIVAR® DrySlide. In some non-limiting embodiments, the routing element consists completely of PE, including PE-UHMW, or a PE-UHMW such as TIVAR® DrySlide. This creates low friction between the contact face and the respective packages. The low friction prevents an undesirable twisting of the packages. At the same time, the wear on the device is reduced, and it allows the routing element to create a return force by the device which is directed substantially perpendicularly to the conveying direction of the package conveyor.

According to some non-limiting embodiments or aspects, the routing element has a weight of 3-10 kg, in particular 4-5 kg. The low weight ensures that deflection of the routing element is possible even with lightweight packages.

According to some non-limiting embodiments or aspects, the routing element has a length of less than 2 m and in particular less than 1.5 m. Thus, the space required for the device, for example inside a sorter, is small. In some non-limiting embodiments, the at least partially curved contact face creates an adequate return force on the respective packages in order to reliably move the packages back onto the nominal track of the package conveyor with as little disruption as possible.

The present disclosure furthermore concerns a package conveyor with at least one conveying element for conveying packages, and a device as described arranged stationarily on the package conveyor. In further non-limiting embodiments, the contact face stands perpendicularly to the movement direction of the conveyor element and extends in the vertical direction for a horizontal movement of the conveyor element. The device is arranged at the side next to the conveyor element, at a distance from 10 mm to 100 mm, and preferably from 20 mm to 70 mm. In normal operation, there may be no contact between the device and the packages conveyed on the conveyor element. In the case of incorrect orientation and/or protrusion of the package beyond the conveying element, the package comes into contact with the contact face of the routing element and is realigned thereby, i.e. returned to its nominal track.

According to some non-limiting embodiments or aspects, the package conveyor includes at least two devices as described above. The devices are arranged on opposite sides of the package conveyor. Thus, the first device firstly returns to the nominal track packages which protrude on the one side, and then the second device returns packages which protrude on the other side.

According to some non-limiting embodiments or aspects, the two devices are arranged offset to one another along the movement direction of the package conveyor.

In some non-limiting embodiments or aspects, the conveyor element comprises a conveyor belt, conveyor rollers, a plurality of transport trays or similar.

The present disclosure furthermore concerns a sorter with at least one package conveyor as described above for conveying, sorting and/or distributing packages.

BRIEF DESCRIPTION OF THE DRAWINGS

The disclosure is described in more detail with reference to non-limiting embodiments and the appended drawings.

FIG. 4 displays a sectional view of the package conveyor according to a non-limiting embodiment from FIG. 1.

DETAILED DESCRIPTION

Figure 1:
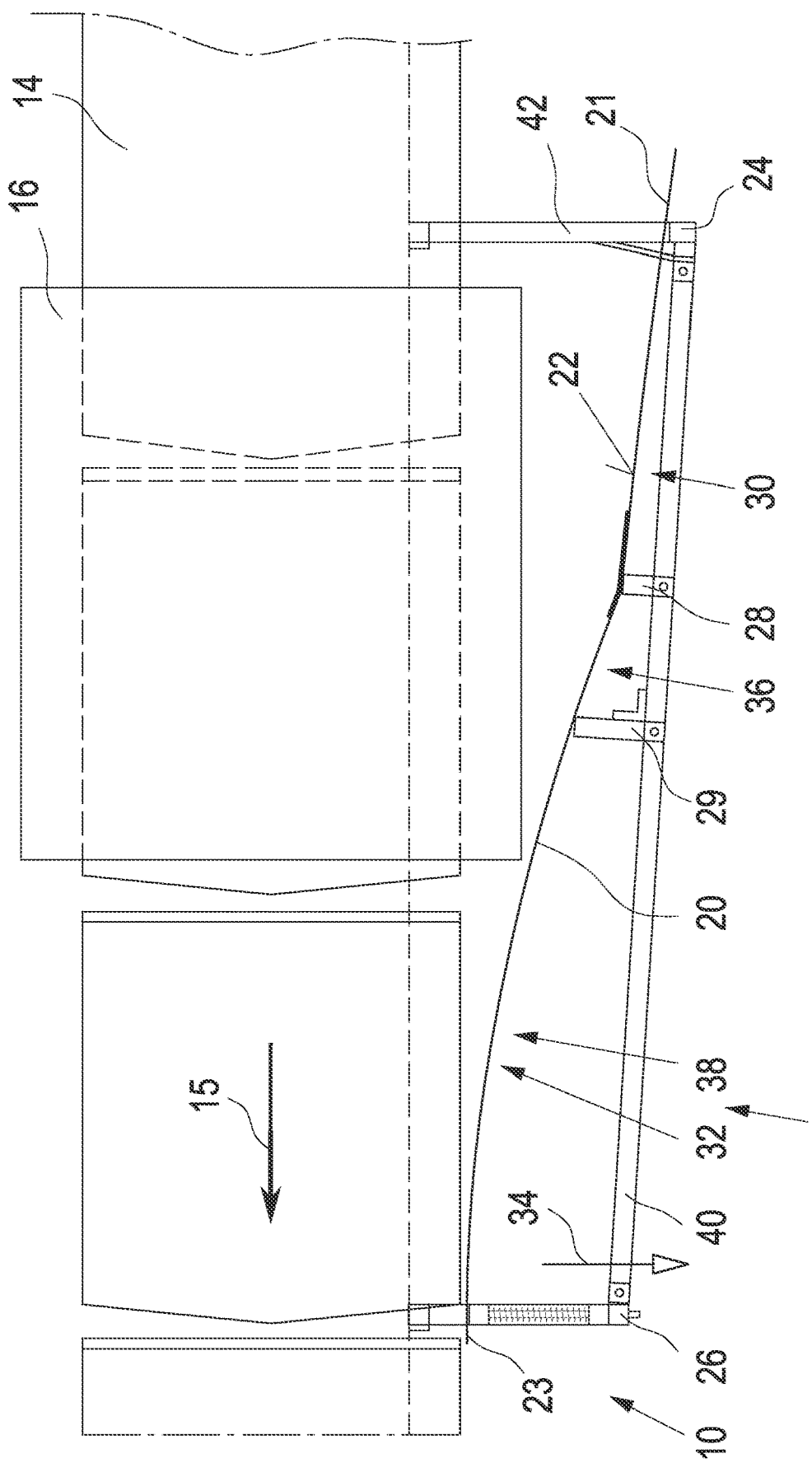
FIG. 1 illustrates a package conveyor with a device according to a non-limiting embodiment, representing a top view.

The package conveyor 10 shown in FIG. 1 is for example configured as a tray package conveyor, and for this has a plurality of trays 14 on which the packages 16, such as for example parcels or similar, are transported in a movement direction 15. Each package is arranged substantially on one tray 14. However, in the case of large packages 16, the package 16 extends over several trays 14. When travelling around corners and when the trays of the package conveyor 10 tilt and straighten, the packages 16 can slip so that the package 16 protrudes laterally beyond the trays 14. Thus, the packages 16 can jam against other components of the package conveyor 10, blocking the conveying direction for the following packages, which are moved out of their nominal track because of the continued movement of the trays 14 and fall off the package conveyor 10. These must then be manually re-introduced at the outlet, which is cost- and time-intensive. Also, the packages 16 may be damaged or the package conveyor 10 or sorter may be damaged.

The device 18 allows the packages 16, which are no longer moved on the nominal track, in particular inside the trays 14, to be aligned accordingly so as to avoid jamming against stationary components of the package conveyor 10. In normal operation, i.e. in the case of correctly aligned packages 16, there is no contact between the device 18 and the conveyed packages 16. The device 18 thus exerts no influence on the package stream when the packages 16 are completely aligned. If however a package 16 leaves its nominal track because of incorrect alignment, and/or a lateral protrusion of the package 16 beyond the package conveyor 10, the package 16 comes into contact with the device 18 which realigns the packages 16 and returns them to their respective nominal track.

With continued reference to FIG. 1, the device 18 has a routing element 20, wherein the routing element 20 forms a contact face 22. Here, the packages 16 come into contact with and move along said contact face 22, and are thereby correspondingly aligned. The routing element 20 is connected to the package conveyor 10 by means of a first connecting element 24, a second connecting element 26 and a third connecting element 28. The first connecting element 24 and the third connecting element 28 may be configured so as to be immovable or fixed. Here, the second guide element is however formed movably. The first connecting element 24 is arranged at the first end 21 of the routing element 20. The second connecting element 26 is arranged at a second end 23 of the routing element 20. The third connecting element 28 is arranged between the first connecting element 24 and the second connecting element 26.

Figure 2:
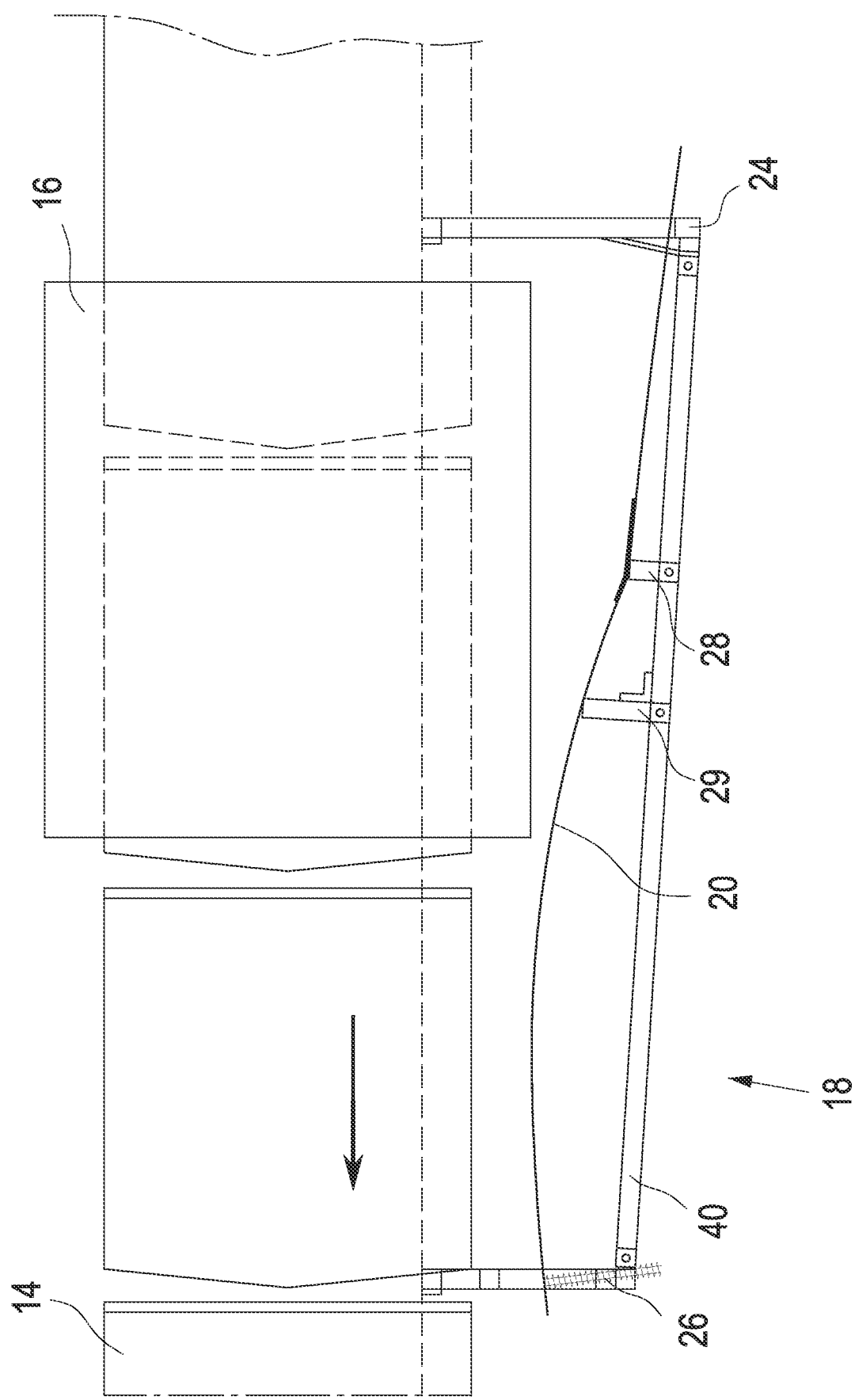
FIG. 2 illustrates the device according to a non-limiting embodiment from FIG. 1 in a deflected state, representing a top view.

With continued reference to FIG. 1, the first connecting element 24 and the third connecting element 28 define a first portion 30 of the routing element 20. In the first portion 30, the routing element 20 has only a slight movability. Furthermore, in the first region 30, the contact face 22 formed by the routing element 20 is straight or not curved. The first portion 30 of the routing element 20 is angled in the direction of the package conveyor 10 along the movement direction 15. Furthermore, a second portion 32 is defined between the third connecting element 28 and the second connecting element 26. In the second portion 32, the routing element is movable as indicated by the arrow 34. Here, at its second end 23, the routing element 20 is movably connected by means of the second connecting element 26. If a package 16 comes into contact with the first portion 30 of the routing element 20, irrespective of the weight of the package 16, a return force is generated on the package 16 in order to move this onto its nominal track in the package conveyor 10. In particular because of the movement of the package conveyor 10 in the movement direction 15, the package 16 moves along the contact face 22 and thus reaches the second portion 32 of the routing element 20. Because of the flexibility of the routing element 20, the second portion 32 is deflected in the direction of the arrow 34, as shown in FIG. 2. The deflection may be substantially proportional to the weight of the package 16. Here, a hinge face 29 is provided which serves as a hinge point for the flexing movement of the routing element 20 in the second portion 32. At the same time, the deflection of the second portion 32 generates a return force on the package 16 in order to move this back onto its nominal track in the package conveyor 10. Because of the provided curvature of the second portion 32 of the routing element 20, a sufficient return force on the package 16 is achieved early. Accordingly, the total length of the routing element 20 may be selected so as to be short. For this, the first portion has a first curvature 36 in the direction of the package conveyor 10. This then transforms in the movement direction 15 into an opposite second curvature 38. At the second end 23 of the routing element 20, the contact face 22 is substantially parallel to the movement direction 15 of the package conveyor 10. This ensures that an undesired twisting of the package at the end of the routing device 20 is avoided.

The routing element 20 may consist completely of TIVAR® DrySlide and thus has a low coefficient of friction. This ensures that the routing device 20 exerts a return force on the package 10 which acts substantially perpendicularly to the movement direction 15. A torque on the package 16 created by the friction is minimised, whereby an undesirable twisting of the package 16 is also avoided.

As shown in FIG. 1, the first connecting element 24, the second connecting element 26 and the third connecting element 28 are connected to the package conveyor 10 via a common frame 40 and corresponding brackets 42. Other embodiments are evidently also possible.

FIG. 1 also show a tray package conveyor 10. As an alternative to the use of trays 14, the device may also be used in package conveyors with a conveyor element configured as a conveyor belt, conveyor rollers or similar.

Figure 3:
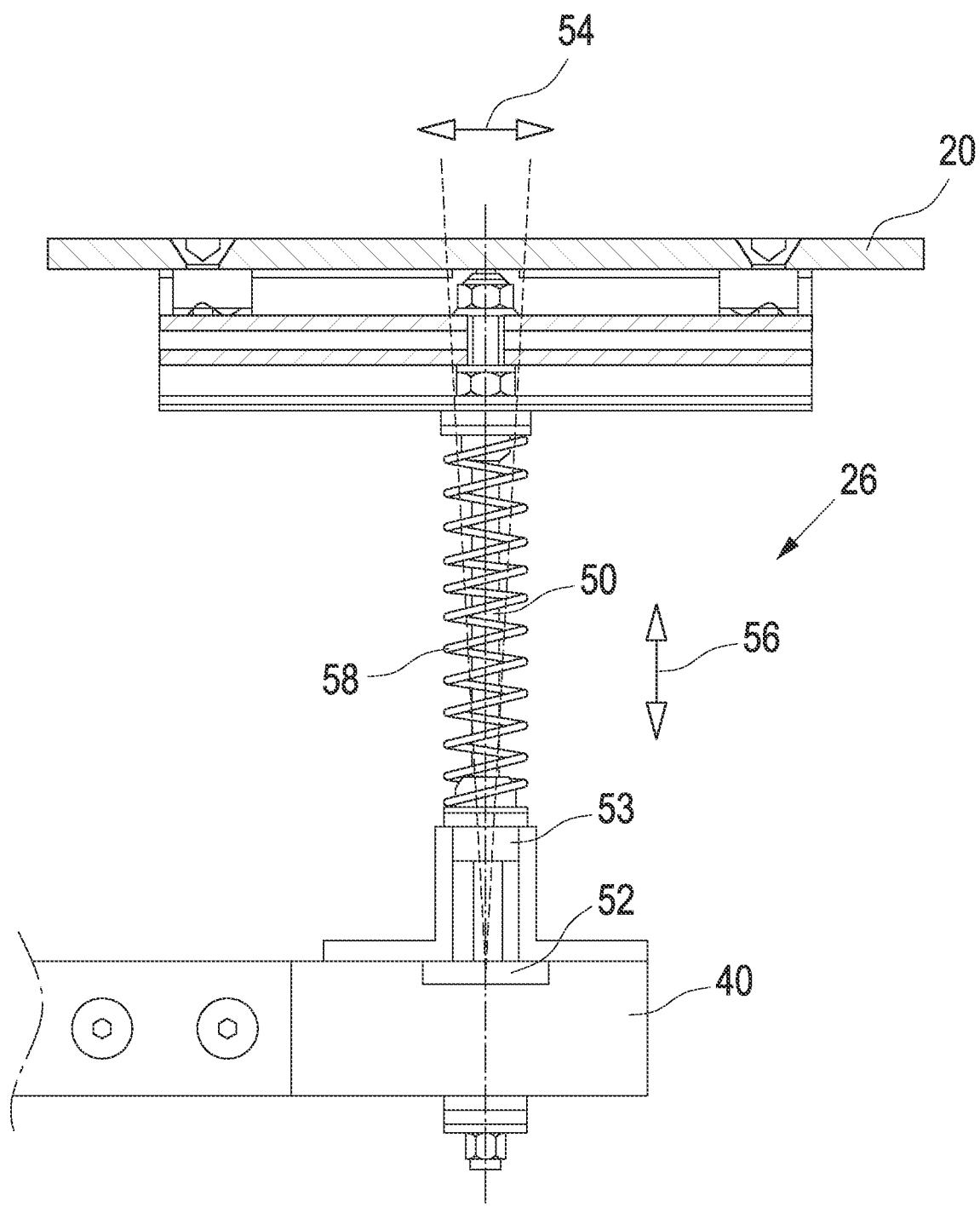
FIG. 3 displays a detail view of the second connecting element of the device according to a non-limiting embodiment from FIG. 1.

FIG. 3 shows a detail view of the second connecting element 26. With reference to FIG. 3, the second connecting element 26 has a first guide element 50 which is connected to the routing element 20. The first guide element 50 is configured as a guide pin. The first guide element 50 is thus guided in a second guide element 52 of the second connecting element 26. The second connecting element 26 includes a first guide bush 52 and a second guide bush 53 arranged spaced apart therefrom in the direction of the routing element. The guide pin 50 is mounted movably inside the first guide bush 52 and the second guide bush 53, as indicated by the arrow 56, wherein a spring element 58 is provided. The movability in the direction 56 is thus allowed against the spring force of the spring element 58. A movement in the direction 56 takes place on a deflection of the routing element insofar as this comes into contact with the contact face 22 of the routing element 20.

With continued reference to FIG. 3, the first guide bush 52 has an opening for guiding the guide pin 50, wherein the opening of the first guide bush 52 corresponds substantially to the outer diameter of the guide pin 50, so that movability along the arrow 56 is still allowed. Furthermore, the second guide bush has an opening for guiding the guide pin 50, wherein the opening of the second guide bush has a diameter which is greater than the diameter of the opening of the first guide bush 52. This achieves a transverse movability corresponding to the arrow 54, wherein by suitable choice of diameter, the necessary movability can be adapted to the application. Because of the transverse movability, the routing element 20 adapts to the respective shapes of the packages and guidance of the packages may be achieved without damaging the packages or device itself.

The transverse movability of the second connecting element 26 along the arrow 54 allows for transverse movability of the routing element 20. This may apply when precisely one spring element 58 and precisely one first guide element 50 and one second guide element 52 are provided. The transverse movability allows the routing element 20 to adapt to different shapes of packages 16.

With reference to FIG. 4, the device is arranged next to the transport elements, shown configured as trays 14, at a distance which amounts to between 20 mm and 100 mm. The routing element extends in the movement direction 15 as shown in FIG. 1. The routing element has a length of less than 2 m, and preferably less than 1.5 m. This guarantees a compact structure of the device 18.

The curved contact face 22 guarantees a safe return of the packages to the nominal track of the package conveyor 10, wherein an undesirable twisting of the packages 16 is prevented. At the same time, the device 18 is fully mechanical and has no substantial wearing parts.

The invention claimed is:

1. A device for aligning packages in a sorter, comprising:
a first connecting element for connection to a package conveyor wherein the package conveyor comprises a nominal track and for packages moving on the nominal track there is no contact between the device and the packages;
a routing element connected to the first connecting element, wherein the routing element forms a contact face which, in case of an incorrect alignment or protruding of the packages, comes into contact with the packages for realignment of the packages onto the nominal track; and
a second connecting element for connection to a package conveyor, wherein the routing element is movably connected to the second connecting element, wherein, in a mounted state, the second connecting element is arranged downstream of the first connecting element in the movement direction,
wherein the contact face is formed at least partially curved.

2. The device according to claim 1, wherein the routing element is fixedly connected to the first connecting element.

3. The device according to claim 1, wherein the routing element is at least partially flexible.

4. The device according to claim 1, wherein the second connecting element comprises a spring element.

5. The device according to claim 1, wherein the second connecting element has a first guide element which is connected to the routing element, and a stationary second guide element which is movably connected to the first guide element, wherein the first guide element and the second guide element have a play so as to allow a transverse movability.

6. The device according to claim 1, further comprising a third connecting element for connection to a package conveyor, wherein the routing element is fixedly connected to the third connecting element, wherein the third connecting element is arranged between the first connecting element and the second connecting element.

7. The device according to claim 6, wherein a first portion of the routing element is defined between the first connecting element and the third connecting element, and a second portion of the routing element is defined between the third connecting element and the second connecting element.

8. The device according to claim 7, wherein the first portion is configured so as to be straight.

9. The device according to claim 7, wherein the second portion is configured so as to be curved.

10. The device according to claim 1, wherein the contact face has a first curvature and a second curvature opposite the first curvature, wherein, in a mounted state, the first curvature points in the direction of the package conveyor and the second curvature points away from the direction of the package conveyor.

11. The device according to claim 1, wherein the contact face is formed from polyethylene (PE), and wherein the routing element consists completely of PE.

12. The device according to claim 1, wherein the routing element has a length of less than 2 meters.

13. The device according to claim 1, further comprising a package conveyor with at least one conveyor element.

14. The device according to claim 13, further comprising a sorter with the package conveyor.

15. The device according to claim 7, wherein the first portion is configured so as to be inflexible.

16. The device according to claim 7, wherein the second portion is configured so as to be flexible.

17. The device according to claim 11, wherein the PE is Ultra High Molar Weight PE (UHMW-PE).

18. The device according to claim 11, wherein the PE is TIVAR® DrySlide.

* * * * *